(12) United States Patent
Quintus et al.

(10) Patent No.: US 9,815,358 B1
(45) Date of Patent: Nov. 14, 2017

(54) FOLDABLE TONNEAU COVER WITH AN EXTRUDED FORWARD SECTION

(71) Applicant: UnderCover, Inc., Rogersville, MO (US)

(72) Inventors: James Quintus, Springfield, MO (US); Robert Joslyn, Nixa, MO (US); Jason Hutchens, Nixa, MO (US)

(73) Assignee: Undercover, Inc., Rogersville, MO (US)

( * ) Notice: Subject to any disclaimer, the term of this patent is extended or adjusted under 35 U.S.C. 154(b) by 0 days.

(21) Appl. No.: 15/194,790

(22) Filed: Jun. 28, 2016

(51) Int. Cl.
*B60J 7/14* (2006.01)
*B62D 33/04* (2006.01)

(52) U.S. Cl.
CPC ............ B60J 7/141 (2013.01); B62D 33/046 (2013.01)

(58) Field of Classification Search
CPC ....................................................... B60J 7/141
USPC ............ 296/100.02, 100.06, 100.17, 100.09, 296/100.1
See application file for complete search history.

(56) References Cited

U.S. PATENT DOCUMENTS

| 4,550,945 | A * | 11/1985 | Englehardt | B60J 7/041 160/213 |
| 7,484,788 | B2 * | 2/2009 | Calder | B60J 7/141 296/100.01 |
| 9,533,555 | B2 * | 1/2017 | Facchinello | B60J 7/106 |
| 2013/0015678 | A1 * | 1/2013 | Williamson | B60J 7/1607 296/100.09 |
| 2016/0200375 | A1 * | 7/2016 | Kerr, III | B60J 7/141 296/100.07 |

* cited by examiner

*Primary Examiner* — Dennis H Pedder
(74) *Attorney, Agent, or Firm* — Harness, Dickey & Pierce, P.L.C.

(57) ABSTRACT

Multiple rear sections can be pivotably coupled and foldable between a deployed arrangement in which a forward section and the rear sections are generally planar, and a storage arrangement in which the rear sections are folded into a stack. The forward section can be mounted to the cargo box and pivotably coupled to an adjacent rear section to support the stack in an upward angled position. The forward section can be formed of an extruded panel having an upper wall member and a lower wall member spaced apart from the upper wall member. The lower wall member can at least partially define a channel. An internal rib can extend between the upper wall member and the lower wall member.

11 Claims, 7 Drawing Sheets

FOLDABLE TONNEAU COVER WITH AN EXTRUDED FORWARD SECTION

FIELD

The present disclosure relates to foldable tonneau covers for covering a cargo box of a pickup truck, and more particularly, to the forward section of such foldable tonneau covers.

BACKGROUND

This section provides background information related to the present disclosure which is not necessarily prior art.

Trucks such as pickups and trucks having a cargo box can be a quite popular type of vehicle because the cargo box enables objects of various sizes to be placed therein and transported. The cargo box pickup generally has a floor surface or bed that is bounded by a front or forward wall, opposing side walls, and a tailgate providing a rearward wall.

Tonneau covers can be used to enclose the cargo box to protect the contents against dirt, debris, and other environmental contaminants, and to improve the aesthetic quality thereof. In some cases, the tonneau covers can be formed of generally planar sections or panels hingedly coupled together so they can be folded together in a stacked arrangement to allow access to the cargo box. The stacked panels typically still leave a portion of the cargo box covered.

In some cases the stacked panels can be rotated into a position above a forward section of the tonneau cover so that the stacked sections extend upwardly above the truck box and rest against or generally adjacent the rear window of the passenger compartment of the pickup. Thus, the forward section can operate to support all the remaining panels of the stack.

In a conventional tonneau cover, the sections are formed of a polymeric foam panel surrounded by a metal frame. Hinge members attached to the frame elements at the front and rear edges couple the section to an adjacent section. Unlike the remaining sections, the forward section is secured to the cargo bed and does not fold. The forward section is similarly formed of a polymeric foam panel to match the remaining sections and provide an aesthetically pleasing appearance. When the stack is rotated over the forward section, the weight is directed through the hinge member and the frame element at the rear of the forward section. Distributing the weight in this manner minimizes damage to the polymeric foam material. Moreover, the frame elements must be sealed. Breakdown of the seal increases the opportunity for water leakage, including along the rear frame element, which is subject to the forces encountered when the stack is rotated upward and the truck travels over uneven, i.e., bumpy, roads.

SUMMARY

This section provides a general summary of the disclosure, and is not a comprehensive disclosure of its full scope or all of its features.

In one aspect of the present disclosure, a tonneau cover for a cargo box of a truck can include a plurality of sections. The plurality of sections can include a forward section and rear sections. The rear sections can be pivotably coupled and foldable between a deployed arrangement, wherein the forward and rear sections are generally planar and a storage arrangement wherein the rear sections are folded into a stack. The forward section can be mountable to the cargo box and pivotably coupled to an adjacent rear section to support the stack in an upward angled position. The forward section can be formed of an extruded panel having an upper wall member and a lower wall member spaced apart from the upper wall member. The lower wall member can at least partially define a channel. An internal rib can extend between the upper wall member and the lower wall member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
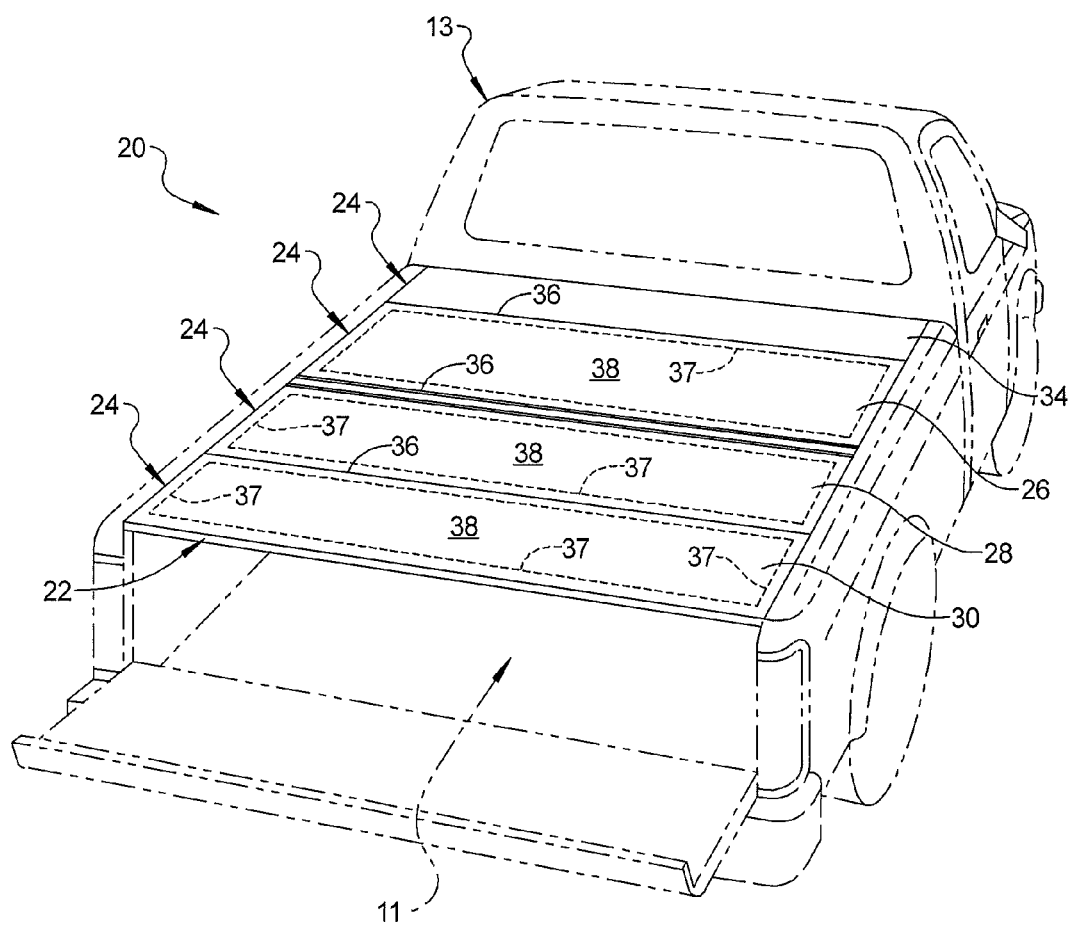
FIG. 1 is a perspective view illustrating a foldable tonneau cover system in accordance with the present disclosure in a deployed, extended or unfolded arrangement covering a cargo box of a pickup truck.

Example embodiments will now be described more fully with reference to the accompanying drawings.

Referring to FIGS. 1 through 6, one example embodiment of a tonneau cover system 20 for covering a truck bed or cargo box 11 is provided. In some cases, the truck bed or cargo box 11 can be part of a pickup truck 13 as shown. Briefly, cargo box 11 can comprise a plurality of sidewalls, namely a lateral or transverse front wall, a pair of opposing longitudinal sidewalls, and a lateral or transverse rear wall or tailgate.

The tonneau cover 22 of the tonneau cover system 20 can include a plurality of panels or sections 24 pivotably or hingedly coupled together in series. In some embodiments, the pivotable coupling or hinge 36 between any of the adjacent panels 24 can include a flexible member 42 coupled between adjacent panels 24. In some embodiments, the pivotable coupling or hinge 36 between any of the adjacent panels 24 can additionally or alternatively include cooperating interlocking rigid elements (not shown) of adjacent panels 24 that engage each other.

The plurality of panels 24 can include a forward panel 34 and a plurality of rear panels 26, 28, 30. This adjacent rear panel 26 is pivotably or hingedly coupled to the forward panel 34, which can be coupled, sealed or both, to the forward wall of the truck bed 11. In some embodiments, the rear panels 26, 28, 30 can each comprise a central rigid panel 38 spanning between peripheral frame members 37. For example, the central rigid panel 38 can comprise a polymeric material, such as a fiber reinforced polymer, spanning between peripheral frame members 37. In some embodiments, the panel sections 24 can each comprise a flexible sheet material panel spanning within the peripheral frame 37.

When the tonneau cover 22 is in the deployed or extended arrangement (e.g., FIGS. 1 and 2), the bottom face of each panel section 24 can be positioned to face toward the bottom surface or floor 23 of the cargo box 11, with the top face opposite the bottom face and facing upwardly or away from the bottom surface 23. In this deployed or extended arrangement, the primary panel plane of each of the plurality sections 24 can all be substantially coplanar with each other and with a first plane, which first plane can be substantially horizontal in the deployed arrangement.

In some embodiments, first and second or left and right side rails 40 can be coupled to the opposite lateral side walls, or longitudinally extending walls, respectively, of the truck box 11. Opposite lateral sides of the panels 24 can be supported upon the side rails 40, respectively, in the deployed arrangement (FIGS. 1 and 2) and in the initial stacked arrangement or intermediate position (FIG. 3).

Figure 2:
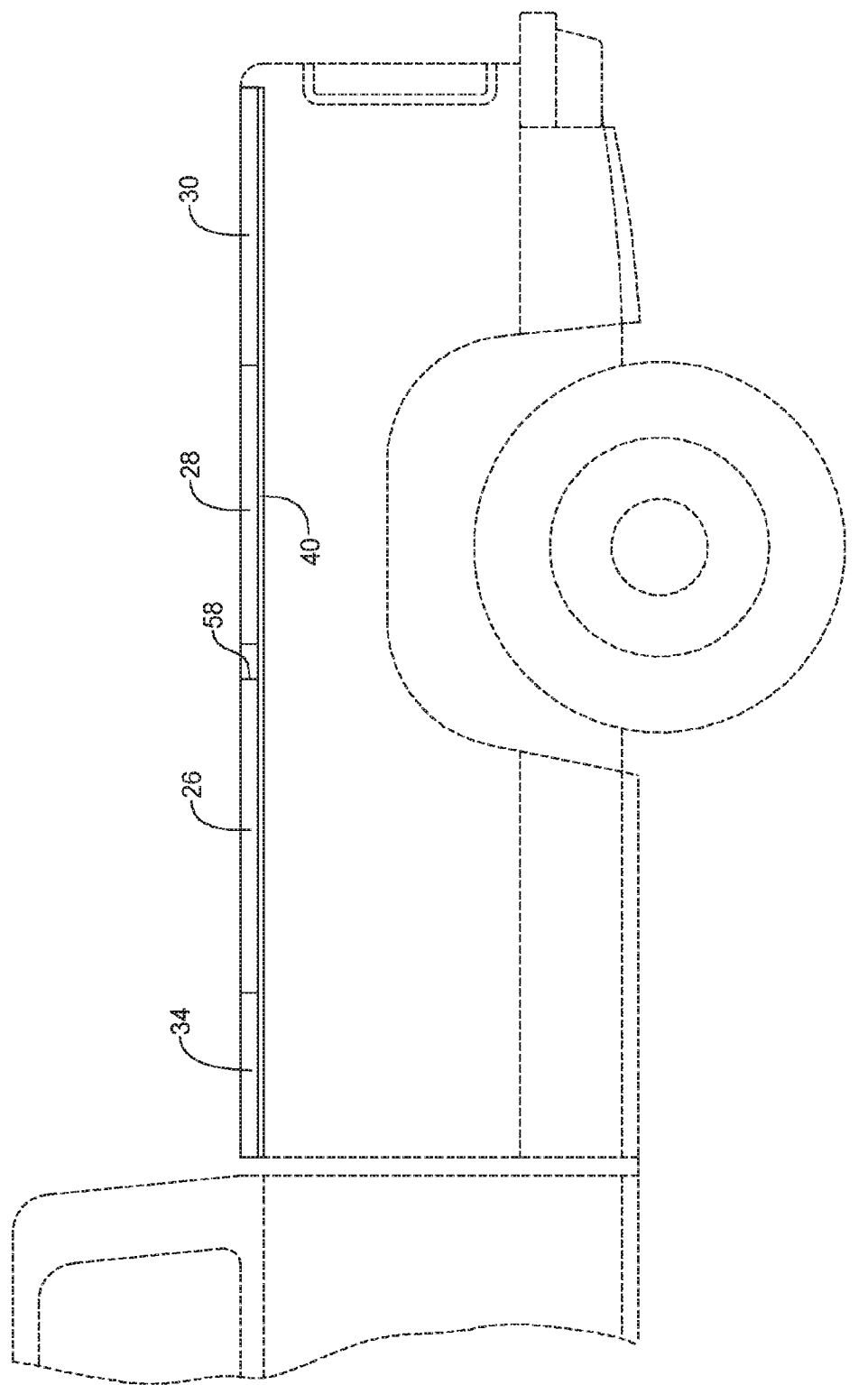
FIG. 2 is a side elevation view of the foldable tonneau cover of FIG. 1 in the deployed, extended or unfolded arrangement covering a cargo box of a pickup truck.
Figure 3:
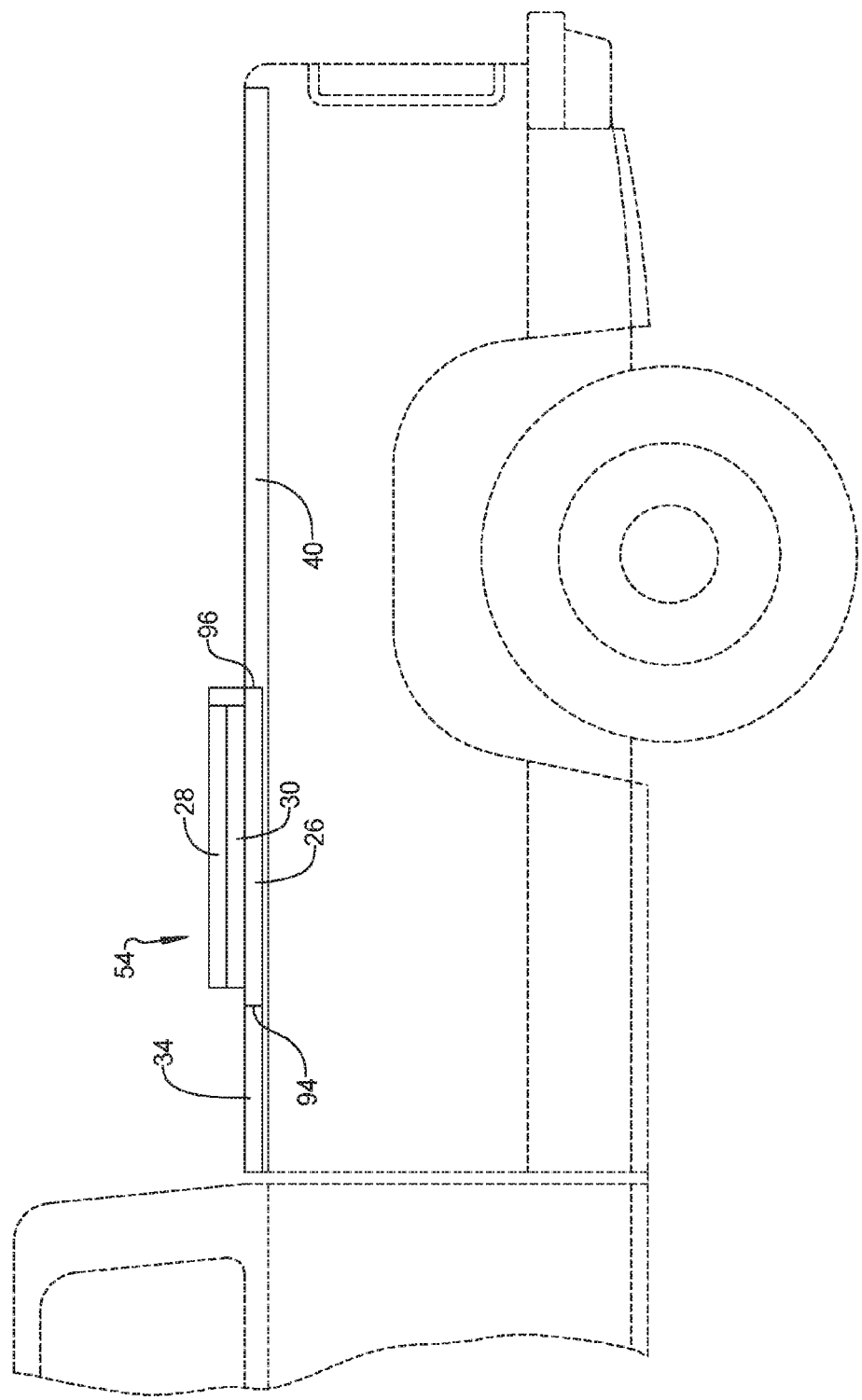
FIG. 3 is a side elevation view of the foldable tonneau cover of FIG. 1 in a stacked arrangement at an intermediate or initial stack position.

The tonneau cover 22 can be folded from the deployed arrangement of FIGS. 1 and 2 into the stacked arrangement of FIG. 3. For example, the rear panel 30 can be pivoted 180 degrees and folded so the top face of the rear panel 30 can be positioned to oppose or face toward the adjacent top face of the third panel 28. This pair of folded panels 30, 28 can then be pivoted 180 degrees and folded onto the second panel 26 to form a completely folded stack 54. Thus, in some embodiments, the tonneau cover 22 can be spiral folded, and the lowermost panel in the stack 54 can be the panel 26 adjacent the forward panel 34.

Figure 4:
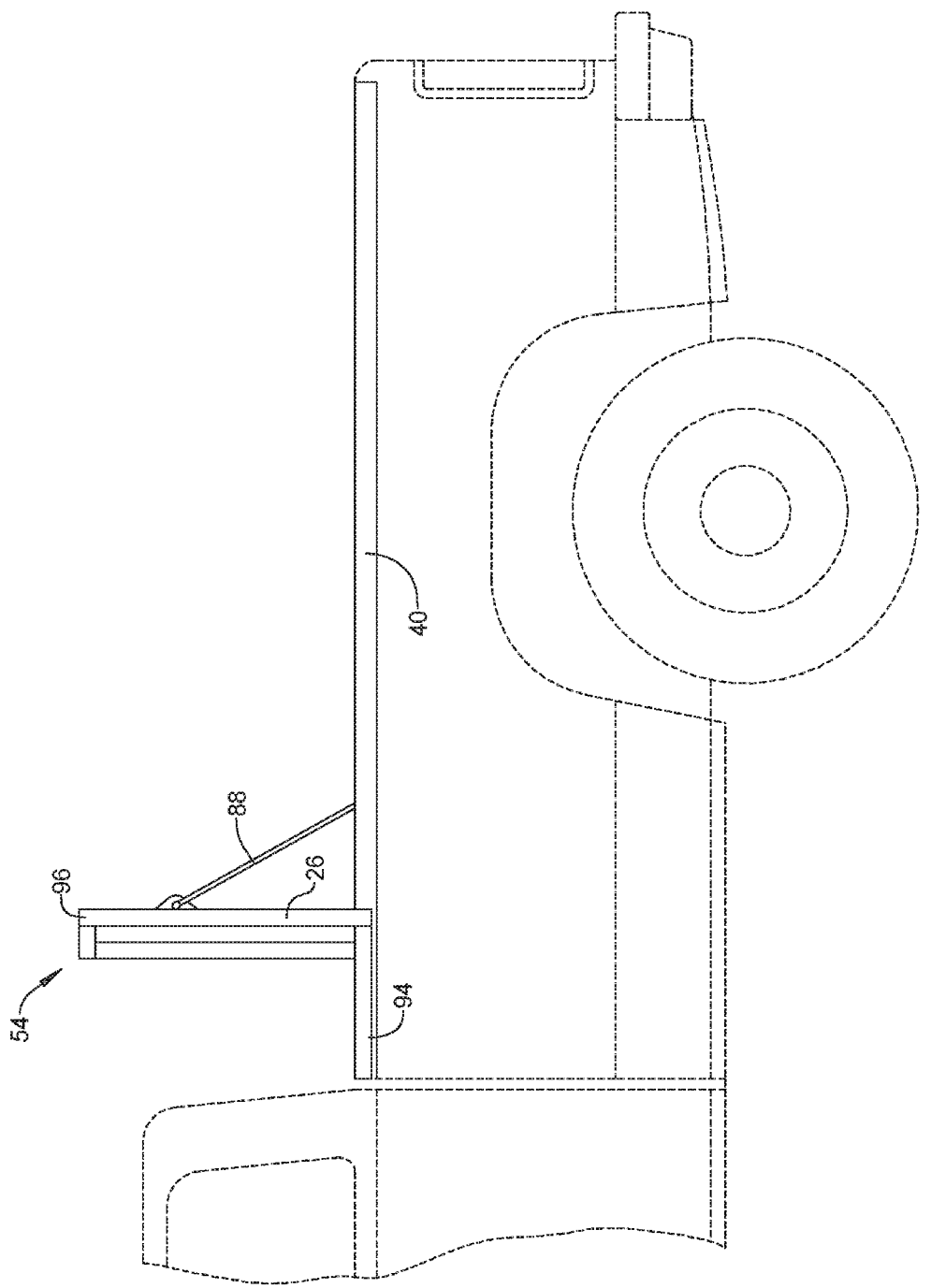
FIG. 4 is a side elevation view of the foldable tonneau cover system of FIG. 1 with the stack in a rotated, upwardly angled position.

FIG. 3 illustrates the stack 54 in the initial stack position (i.e., the initial position where the formation of the stack is completed) of this embodiment. This initial stack position can also be referred to as the intermediate position, since it can also be the position intermediate the deployed position (FIGS. 1 and 2) and the upward or upwardly angled position (FIG. 4). The side rails 40 can be mountable to the cargo box 11 to support the stack 54 so that the stack 54 extends above the cargo box 11 in the stacked arrangement.

The rear panel 26 is adjacent and pivotably coupled to the forward panel 34. The stack 54 can be rotated between the intermediate position of FIG. 3 and an upward, upwardly angled, or upwardly extending position exemplified by FIG. 4. In some embodiments, in the intermediate position, both a front edge 94 of the adjacent rear panel 26 and a rear edge 96 of the adjacent rear panel 26 are adjacent the side rail 40 and, in the upward position, the rear edge 96 of the forward panel 26 is spaced above the front edge 94 and above the side rail 40. In some embodiments, the stack 54 can be retained or locked in the upward position by a link arm 88 coupled between the stack 54 and the side rail 40. One example of such a retention or locking mechanism is disclosed in U.S. patent application Ser. No. 15/096,764, filed Apr. 12, 2016, which is hereby incorporated herein by reference in its entirety.

The forward panel or section 34 is formed of an extruded panel 52. In some embodiments, the extruded panel 52 forming the forward panel 34 is an extruded metal panel. For example, such an extruded metal panel 52 can be an extruded aluminum panel. As an extruded member, the extruded panel 52 can have a uniform cross-section or cross-sectional shape along its longitudinal length. The extruded panel 52 can have an upper wall or plate member 44 and a lower wall or plate member 46. Each wall member 44, 46 can include an interior surface 48, 50. The interior surface 48 of the upper wall member 44 and the interior surface 50 of the lower wall member 46 can be spaced apart from each other.

In some embodiments, the upper wall member 44 can include a longitudinally extending central region 62 that is recessed internally relative to the upper wall member 44 at the front edge 64 and the rear edge 66 of the forward panel 34. Alternatively or additionally, the lower wall member 46 can include a similar longitudinally extending central region (not shown) corresponding to 62 that is recessed internally relative to the lower wall member 46 at the front edge 64 and the rear edge 66 of the forward panel 34.

In some embodiments, the extruded panel 52 can include a longitudinally extending channel 56. As in the illustrated example of FIGS. 5 and 6, the channel 56 can be positioned completely between the outer surface 58 of the upper wall member 44 and the outer surface 60 of the lower wall member 46. For example, the channel 56 can be positioned completely between the outer surface 58 of the upper wall member 44 and the outer surface 60 of the lower wall member 46 at portions thereof that cooperate to define the channel 56. Additionally or alternatively, the channel 56 can be positioned completely between the outer surface 58 of the upper wall member 44 and the outer surface 60 of the lower wall member 46 at portions thereof at the front edge 64 and the rear edge 66.

Figure 7:
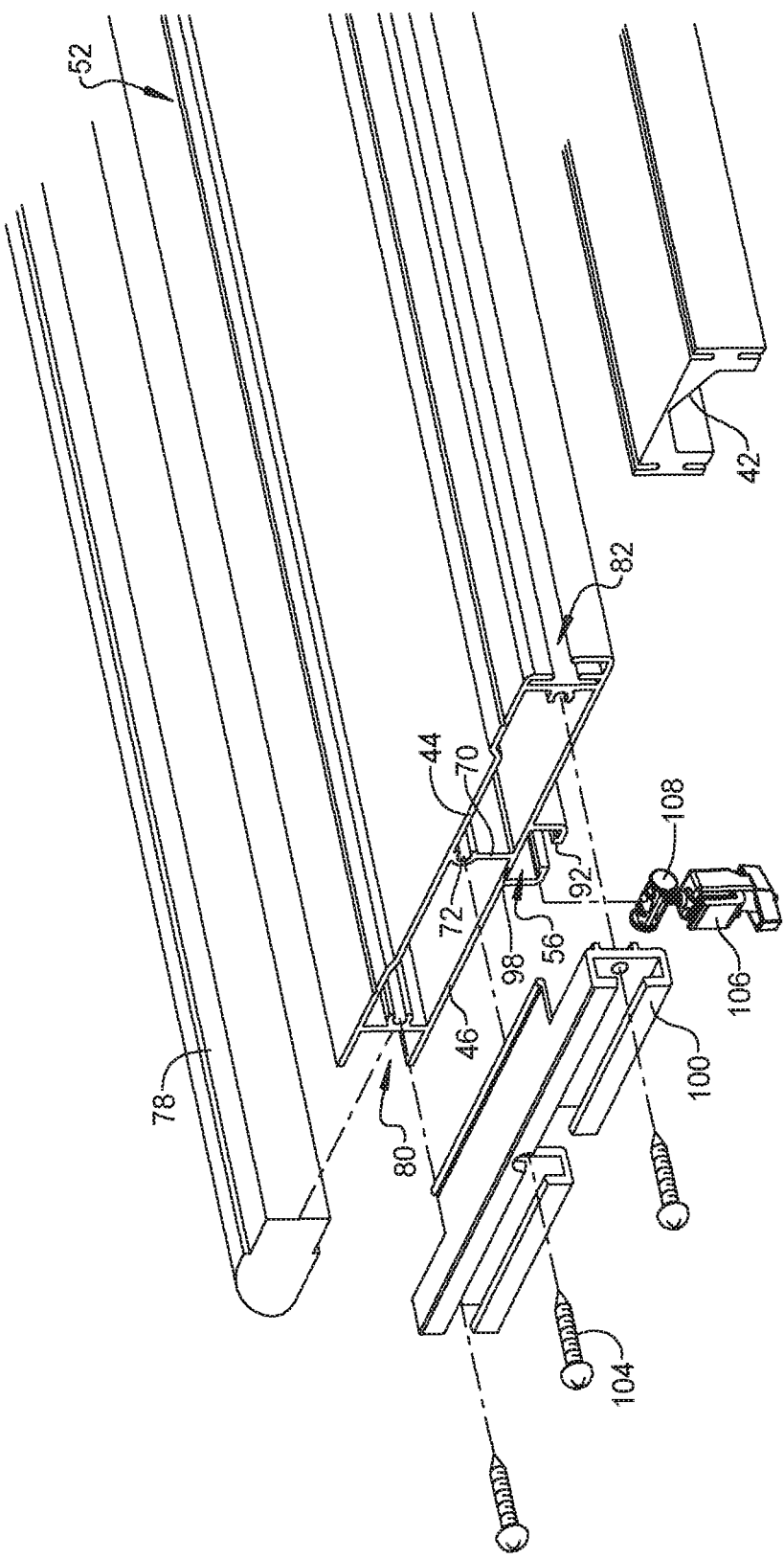
FIG. 7 is a partial perspective exploded view of another exemplary forward section for the foldable tonneau cover system.

As in the illustrated example of FIG. 7, the longitudinally extending channel 56 can be positioned partially or completely outside or below the outer surface 60 of the lower wall member 46. For example, the channel 56 can be positioned to extend partially or completely below the outer surface 60 of the adjacent lower wall member 46 portion at the central region 86 thereof. Additionally or alternatively, the channel 56 can be positioned to extend partially or completely below the outer surface 60 of the lower wall member 46 at portions thereof at the front edge 64 and the rear edge 66.

In some embodiments, the longitudinally extending channel 56 is designed to receive and slidably retain a coupling member 108 of a tonneau-to-cargo-box-attachment clamp 106 to the forward panel 34. Such a tonneau-to-cargo-box-attachment clamp 106 can be used to couple the tonneau cover 22 to the cargo box 11. Thus, the channel 56 can include a longitudinal slot or opening 92 through which such a tonneau-to-cargo-box-attachment clamp 106 can extend, and which can allow the clamp 106 to be manually slid along the channel 56. One exemplary tonneau-to-cargo-box-attachment clamp is disclosed in U.S. patent application Ser. No. 14/874,795 filed Oct. 5, 2015, and published as US 2016-0096421 on Apr. 7, 2016, which is hereby incorporated herein by reference in its entirety.

Figure 5:
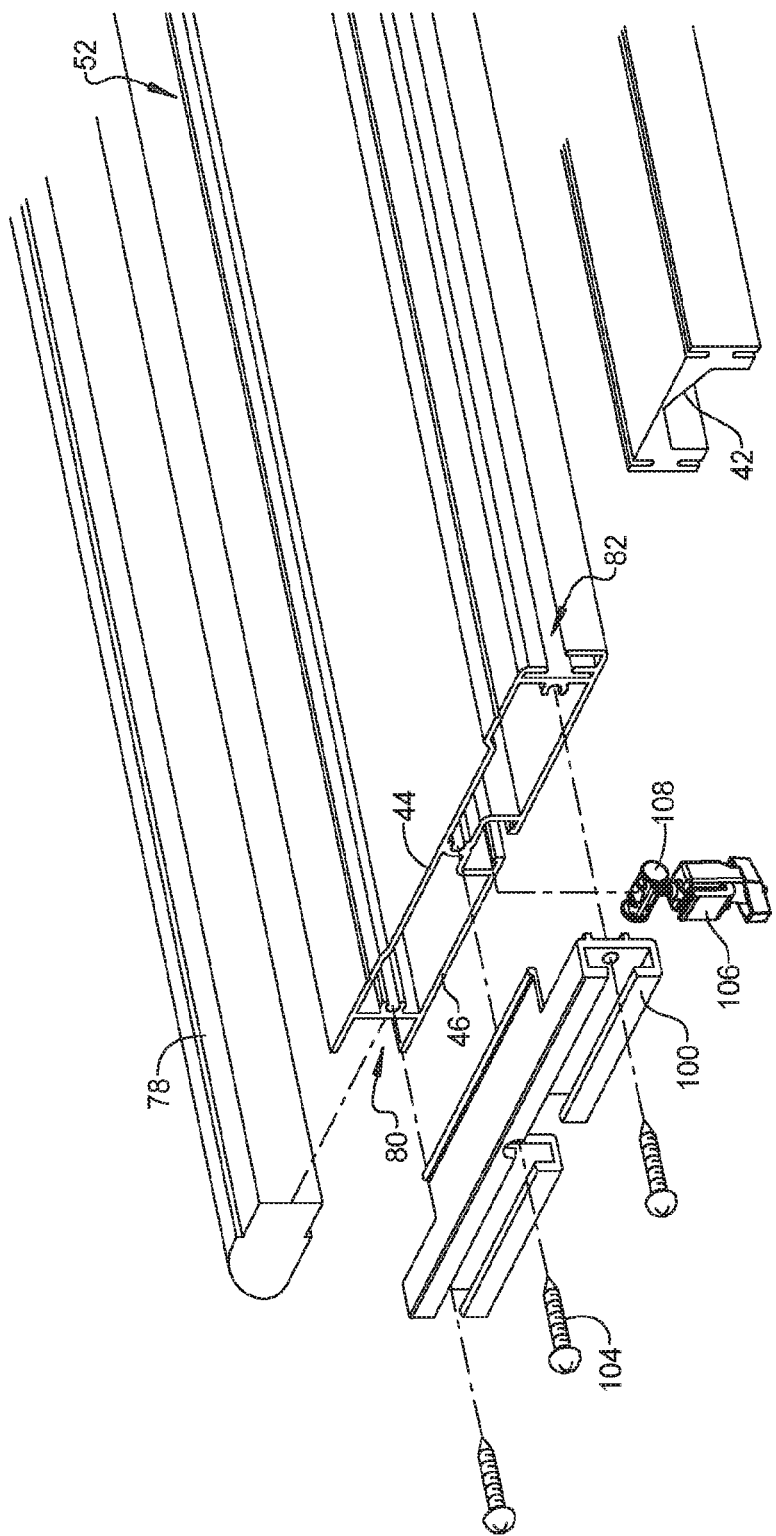
FIG. 5 is a partial perspective exploded view of one exemplary forward section for the foldable tonneau cover system.
Figure 6:
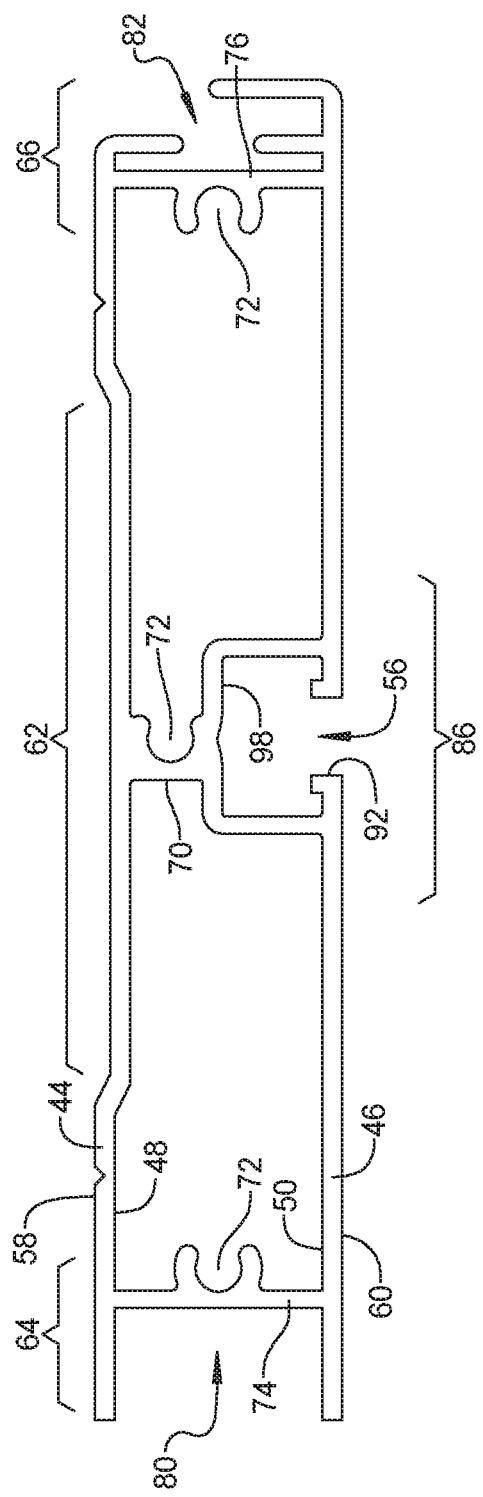
FIG. 6 is a cross-sectional view of the extruded panel of the forward section of FIG. 5.

As in the illustrated example of FIGS. 5 and 6, the lower wall member 46 can include a longitudinally extending central planar region 86. The longitudinally extending opening 92 can be located in the central planar region 86, which region 86 can define a portion of the channel 56. A channel base wall member 98 can partially define the channel 56.

The base wall member 98 can be positioned opposite the opening 92 and intermediate the upper wall member 44 and the lower wall member 46. In some embodiments, an internal rib 70 can extend between the upper wall member 44 and the lower wall member 46. As in the illustrated embodiments, the internal rib 70 can extend between a portion of the lower wall member 46 defining the channel 56 and the upper wall member 44. For example, the rib 70 can extend or span between the base wall member 98 and the upper wall member 44.

In some embodiments, the rib 70 can include a coupling aperture 72. Additionally or alternatively, the front edge 64 and the rear edge 66 of the extruded panel 52 can include coupling apertures 72. For example, front wall 74, rear wall 76, or both, can extend between the upper wall member 44 and lower wall member 46 at the front edge 64 and the rear edge 66, respectively, of the extruded panel 52 and can include coupling apertures 72. As in the illustrated embodiments, the coupling apertures 72 can include a C-shaped cross-sectional shape.

In some embodiments, the forward panel 34 can include a pair of opposite lateral side or end caps 100; one for each of the two opposite lateral ends 102 or sides of the extruded member 52. The end caps 100 can close the opening into the interior of the extruded member 52 at the ends 102 thereof. Additionally or alternatively, the end caps 100 can close the front channel 80 or the rear channel 82, or both, to help retain the bulkhead seal 78 or the hinge member 42, or both, within their respective channel. Coupling members 104 can be provided that are designed to cooperate with the coupling apertures 72 to retain the end caps on the ends 102 of the extruded member 52.

In some embodiments, the cooperating coupling members 104 can be separate components. For example, the coupling members 104 can be threaded members, such as screws, that extend through apertures in the end caps 100 and are cooperating retained within the coupling apertures 72 to couple the end caps 100 to the extruded member 52. Alternatively, the cooperating coupling members can be an integral extension of a single piece component forming the end caps 100.

In some embodiments, the forward panel 34 can include a bulkhead seal member 78 extending along the forward longitudinal edge 64 of the extruded panel 52. The bulkhead seal member 78 can be designed to provide a seal between the forward panel 34 and the laterally extending front wall of the cargo box 11. The bulkhead seal member 78 can be coupled to the extruded panel 52 in various ways. For example, a longitudinally extending adhesive strip or material can be provided between the bulkhead seal member 78 and the extruded panel 52. Alternatively or additionally, the bulkhead seal member 78 can be frictionally received within a bulkhead seal coupling channel 80 of the extruded panel 52 extending along the front edge 64, thereby coupling the bulkhead seal member 78 to the extruded panel 52.

In some embodiments, the extruded panel 52 can include a hinge coupling channel 82 extending along the rear longitudinally extending edge 66 thereof. The hinge coupling channel 82 can be designed to engage with cooperating features of the flexible hinge member 42 to couple the flexible hinge member to the extruded panel 52. The hinge 36 between the forward panel 34 and the adjacent or forward-most rear panel 26 can comprise the flexible hinge member 42. In some embodiments, the flexible hinge member 42 can comprise a living hinge, or can be made of a rubber material, or can be both.

Thus a tonneau cover 22 can be provided that includes a plurality of sections 24, wherein the forward section 34 is formed as an integral extruded panel. The forward section 34 can be hingedly coupled to the remaining sections 26, 28, and 30. Because the forward panel 34 is formed of an integral element, when the remaining sections are folded into a stack 54, and the stack 54 is rotated over the forward section 34, the weight of the stack 54 is distributed over and carried by the entire panel section 34, as opposed to being mainly carried by a frame member 37 or portion along a forward edge of the forward section. Also, by eliminating separate frame components 37 surrounding a central panel, water leakage due to failure of the frame-to-panel seal, particularly at rear edge frame member 37 that is subjected over time to carrying the weight of the stack 54 in the rotated or upward angled position. Still further, the integral extruded forward panel 34 reduces the number of components in the forward section and labor needed for assembly, and thereby reduces the cost.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover for a cargo box of a truck, the tonneau cover comprising:
   a plurality of sections comprising a forward section and rear sections, each section spanning between a front edge and a rear edge;
   the rear sections being pivotably coupled and foldable between a deployed arrangement in which the forward and rear sections are generally planar and a storage arrangement in which the rear sections are folded into a stack, wherein each of the rear sections has a multi-component construction between the front edge and the rear edge of each rear section that includes both a central panel and support frame members;
   the forward section mountable to the cargo box and pivotably coupled to an adjacent rear section to support the stack in an upward angled position; and
   the forward section being formed of an unitary extruded panel having an upper wall member and a lower wall member spaced apart from the upper wall member, the lower wall member at least partially defining a channel, wherein the forward section has a single-component construction between the front edge and the rear edge of the front section that is defined by the unitary extruded panel.

2. The tonneau cover of claim 1, wherein the central panel of each of the rear sections is a rigid central panel.

3. The tonneau cover of claim 2, wherein the extruded panel is an extruded metal panel and the rigid central panel is a polymeric panel.

4. The tonneau cover of claim 1, wherein a pair of outer walls extend between the upper and lower wall members, and an internal rib is positioned internally between the outer walls and extends from a portion of the lower wall member defining an upper wall of the channel to the upper wall member.

5. The tonneau cover of claim 1, further comprising a tonneau-to-cargo-box-attachment clamp slidably received in the channel.

6. The tonneau cover of claim 1, wherein the forward section comprises a front edge and a rear edge, the upper wall member and the lower wall member being joined at a forward edge and a rear edge of the forward section, and wherein the forward section is pivotably coupled to the adjacent rear section at the rear edge.

7. The tonneau cover of claim 1, wherein the upper wall member includes a central region recessed relative to the front edge and the rear edge.

8. The tonneau cover of claim 1, wherein the channel is positioned within the extruded panel between the upper wall member and the lower wall member.

9. The tonneau cover of claim 1, wherein the lower wall member includes a central region that is planar, and wherein the channel includes a longitudinal opening at the central region and a base wall member opposite the opening, and wherein the base wall member is disposed intermediate the upper wall member and the lower wall member.

10. The tonneau cover of claim 1, wherein the extruded panel comprises a first lateral end and a second lateral end opposite the first lateral end, and wherein the forward section further comprises a first end cap attached to the first lateral end and a second end cap attached to the second lateral end.

11. The tonneau cover of claim 10, wherein a pair of outer walls extend between the upper and lower wall members, and an internal rib is positioned internally between the outer walls and the internal rib comprises a coupling aperture, and wherein the first end cap is attached to the extruded panel by a threaded member engageably received in the coupling aperture.

* * * * *